United States Patent
Hewitt et al.

(10) Patent No.: US 6,253,304 B1
(45) Date of Patent: Jun. 26, 2001

(54) COLLATION OF INTERRUPT CONTROL DEVICES

(75) Inventors: Larry Hewitt; David Neal Suggs; Greg Smaus; Derrick R. Meyer, all of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/224,821

(22) Filed: Jan. 4, 1999

(51) Int. Cl.$^7$ .................................................. G06F 9/46
(52) U.S. Cl. ................................... 712/6; 712/30
(58) Field of Search ................... 712/30, 6, 232, 712/3, 33, 36; 710/260

(56) References Cited

U.S. PATENT DOCUMENTS

| | | | |
|---|---|---|---|
| 5,283,904 | 2/1994 | Carson et al. | 395/725 |
| 5,446,910 * | 8/1995 | Kennedy | 710/119 |
| 5,481,725 | 1/1996 | Jayakumar et al. | 395/725 |
| 5,495,569 * | 2/1996 | Kotzur | 714/2 |
| 5,511,200 | 4/1996 | Jayakumar | 395/739 |
| 5,551,044 | 8/1996 | Shah et al. | 395/750 |
| 5,555,420 | 9/1996 | Sarangdhar et al. | 395/739 |
| 5,613,128 | 3/1997 | Nizar et al. | 395/739 |
| 5,619,705 | 4/1997 | Karnik et al. | 395/739 |
| 5,619,706 | 4/1997 | Young | 395/741 |
| 5,832,279 * | 11/1998 | Rostoker | 710/266 |
| 5,862,366 * | 1/1999 | Schmidt | 703/21 |
| 5,884,027 * | 3/1999 | Garbus | 709/250 |
| 5,978,903 * | 11/1999 | Quimby | 712/229 |

OTHER PUBLICATIONS

Intel, "Pentium Pro Family Developer's Manual—vol. 3: Operating System Writer's Manual", Jan. 1996, pp. 7–9 to 7–45.
Intel, "82093AA I/O Advanced Programmable Interrupt Controller (IOAPIC)", May 1996, pp. 1–20.
Messmer, Hans–Peter, "The Indispensable Pentium Book", Addison–Wesley Publishers Ltd., 1995, pp. 271–278.
Intel, "MultiProcessor Specification", Version 1.4, May 1997, pp. 1–1 to 1–4, 2–2 to 2–5, 3–1 to 3–16, 4–1 to 4–24, 5–1 to 5–8, A–1 to A–5, B–1 to B–7, C–1, D–1 to D–3, E–1 to E6, and Glossary–1 to Glossary–2.

* cited by examiner

Primary Examiner—Eric Coleman
(74) Attorney, Agent, or Firm—Zagorin, O'Brien & Graham, LLP

(57) ABSTRACT

A first and a second local interrupt controller are disposed on a single integrated circuit. The first and second local interrupt controllers are coupled to controllably provide at least one interrupt request signal, respectively, to a first and second processor. An input/output (I/O) interrupt controller is also on the integrated circuit and coupled to receive an interrupt request from at least one input/output device. A communication circuit on the integrated circuit is coupled to the input/output interrupt controller and the first and second local interrupt controllers. The communication circuit provides for transfer of interrupt information between the first local interrupt controller, the second local interrupt controller and the input/output interrupt controller.

29 Claims, 10 Drawing Sheets

| 31 : 8 | 7 : 0 |
|---|---|
| RESERVED | INTACK |

FIG. 6A

| 31 : 24 | 23 : 16 | 15 : 10 | 9 | 8 | 7 : 0 |
|---|---|---|---|---|---|
| RESERVED | LAVER | RESERVED | LAPICEN | SUSTAT | SUVEC |

FIG. 6B

| 7 : 1 | 0 |
|---|---|
| RESERVED | APIC EN |

FIG. 6C

COLLATION OF INTERRUPT CONTROL DEVICES

BACKGROUND OF THE INVENTION

1. Field of the Invention

This application relates to co-pending application Ser. No. 08/224,820, filed the same day as this application, entitled ADDRESS SPACE CONVERSION TO RETAIN SOFTWARE COMPATIBILITY IN NEW ARCHITECTURES, by Larry Hewitt and Greg Smaus, which application is hereby incorporated by reference in its entirety.

2. Description of the Related Art

Many of today's multiprocessor computer systems utilize an interrupt scheme known as the advanced programmable interrupt controller (APIC). The APIC interrupt scheme allows hardware generated interrupts to be distributed to central processing units (CPUs) such that interrupts tend to avoid CPUs that are busy with higher priority tasks and interrupts tend to be assigned to CPUs that are involved in lower priority tasks. Also, the APIC interrupt approach allows CPUs to send interrupts to other CPUs via what is called an interprocessor interrupt (IPI). The APIC register set has become an industry-wide standard in the personal computer industry and is used by a large number of multiprocessing operating systems.

The APIC scheme includes two distinct interrupt controllers that typically reside on separate integrated circuits. One integrated circuit is called the input/output (I/O) APIC, which typically resides on the industry standard architecture (ISA) bus of a personal computer system. The second integrated circuit is the local integrated circuit or local APIC, which typically resides with each CPU either inside the CPU package or linked to the CPU via its host bus interface. Thus, there is one local APIC for each CPU in the system. The I/O APIC includes input pins that are driven by sources of hardware interrupts. The local APIC includes interrupt prioritization logic and methods for sending and receiving interrupts from external sources such as other local APICs or the I/O APIC.

A typical prior art APIC configuration is illustrated in FIG. 1. Each CPU 10, 12, 14, and 16 has a corresponding local APIC 11, 13, 15, and 17. The local APICs are all connected via APIC bus 20. Also attached to APIC bus 20 is I/O APIC 22 which is typically incorporated in an input/output integrated circuit 24.

The APIC bus 20 allows the various local APICs and the I/O APIC to communicate with each other. Thus, interrupts from, e.g., input/output devices received by the I/O APIC can be communicated to various of the local APICs and thus be serviced by one of the processors in the multiprocessor system. Prior art multiprocessor interrupt controller approaches are further described in U.S. Pat. No. 5,555,420 entitled "Multiprocessor Programmable Interrupt Controller System with Separate Interrupt Bus and Bus Retry Management" and U.S. Pat. No. 5,613,128 entitled "Programmable Multi-Processor Interrupt Controller System With a Processor Integrated Local Interrupt Controller," which patents are incorporated herein by reference.

The prior art interrupt controller approach, as illustrated in FIG. 1, has several disadvantages. If the local APIC is on the central processing unit integrated circuit as shown, for example, in FIG. 1, then the cost of providing the local APIC is high in terms of silicon real estate relative to other potential places in the system. On the other hand, if the local APIC is external to the CPU, but on the host bus, then an additional device must be added to the typical PC architecture. In a multiprocessor system, an additional integrated circuit must be included for each CPU in the system. Further, because the APIC bus is serial, there exists a latency from the time that the hardware interrupt is received on the I/O APIC and the time when that interrupt is transmitted to the local APIC via the serial bus. Further, the protocol for the serial bus is complex and difficult to design. Accordingly, it would be desirable to provide a simpler advanced programmable interrupt controller scheme for use in a multiprocessor environment that avoided expending costly CPU silicon area for interrupt controllers and also reduced latency in interrupt service.

SUMMARY OF THE INVENTION

Accordingly, in one embodiment of the invention, a first and a second local interrupt controller are disposed on a single integrated circuit. The first and second local interrupt controllers are coupled to controllably provide at least one interrupt request signal, respectively, to a first and second processor. An input/output (I/O) interrupt controller is also on the integrated circuit and coupled to receive an interrupt request from at least one input/output device. A communication circuit on the integrated circuit is coupled to the input/output interrupt controller and the first and second local interrupt controllers. The communication circuit provides for transfer of interrupt information between the first local interrupt controller, the second local interrupt controller and the input/output interrupt controller.

In another embodiment of the invention, a method provides a plurality of local interrupt controllers disposed on a first integrated circuit. The method includes, connecting each of the interrupt controllers via a respective plurality of local interrupt signal lines to a respective corresponding processor. At least one input/output interrupt controller is disposed on the first integrated circuit and communicatively coupled to the plurality of local interrupt controllers. An interrupt request is sent to the input/output interrupt controller from an input/output device. At lease one of the local interrupt controllers is provided with information relating to the interrupt request. The interrupt request is communicated to from one of the local interrupt controllers to the respective corresponding processor via one of the local interrupt signal lines.

BRIEF DESCRIPTION OF THE DRAWINGS

The present invention may be better understood, and its numerous objects, features, and advantages made apparent to those skilled in the art by referencing the accompanying drawings.

FIG. 6A shows the interrupt acknowledge register.

FIG. 6B shows a local APIC control register.

FIG. 6C shows an I/O APIC control register.

DESCRIPTION OF THE PREFERRED EMBODIMENT(S)

Figure 1:
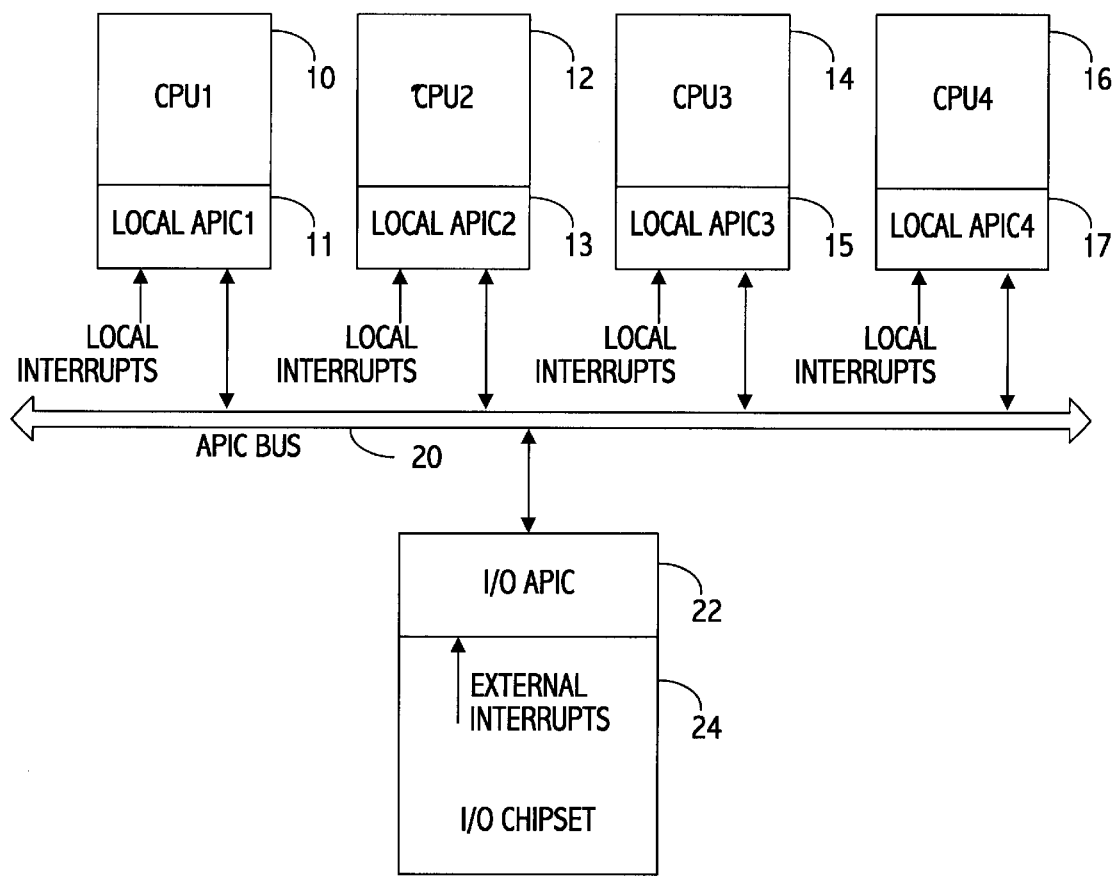
FIG. 1 shows an APIC configuration in a CPU multiprocessor system according to the prior art.
Figure 2:
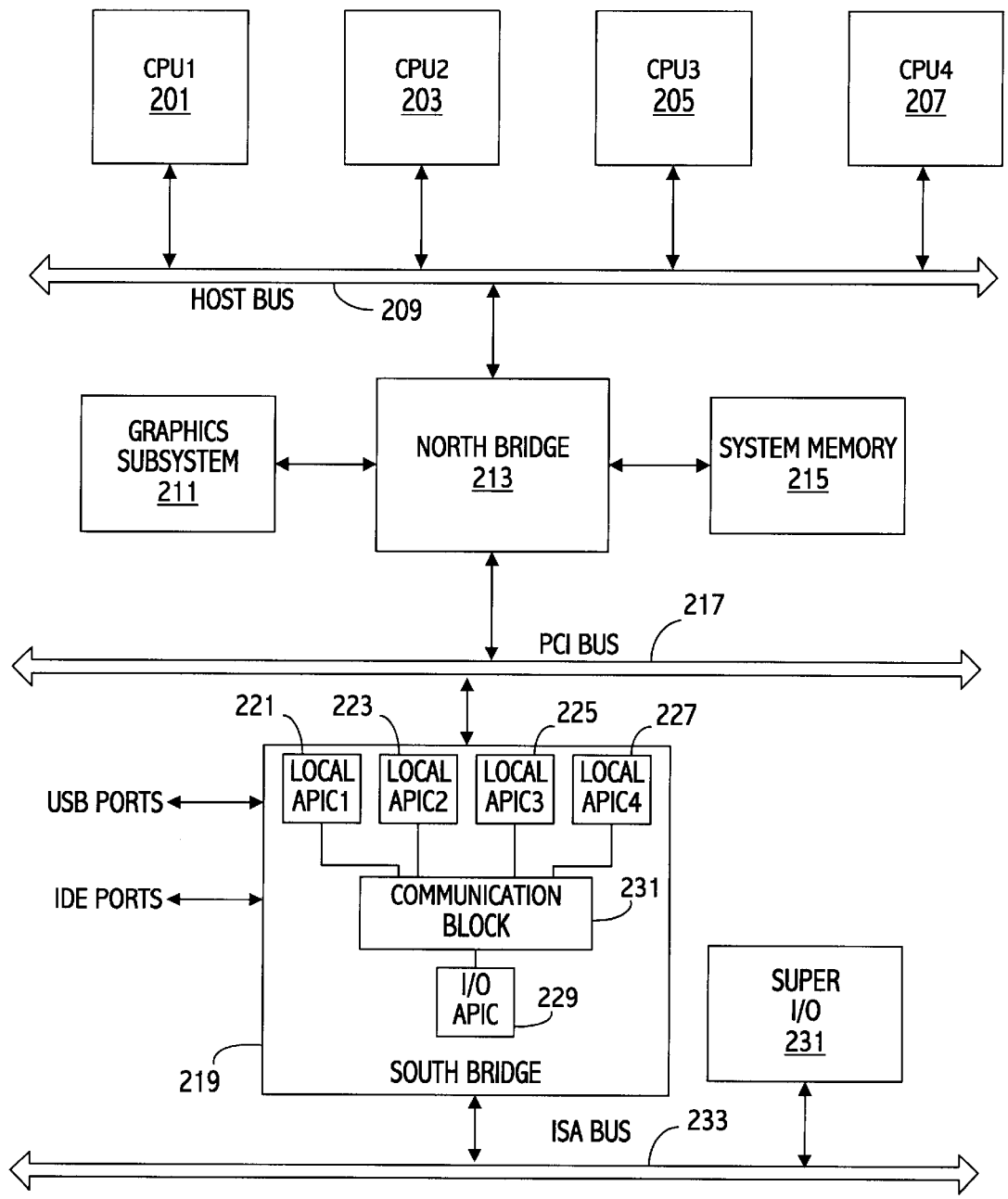
FIG. 2 shows a block diagram of an advanced programmable interrupt controller architecture in a multiprocessor system according to the present invention.

Referring to FIG. 2, one embodiment of the present invention is illustrated which the I/O APIC 229 and the local APICs 221, 223, 225, and 227 reside on the traditional south bridge integrated circuit 219 of a standard personal computer system. Also included in the personal computer system of FIG. 2, which is a multiprocessor computer system, are CPUs 201 through 207 coupled to host bus 209 and via host bus 209 to a north bridge integrated circuit 213. The north bridge 213 provides a bridge between the host bus and the peripheral component interface (PCI) bus 217. In addition, north bridge 213 provides an interface between system memory 215 and host bus 209 and thus processors 201 through 207. North bridge 213 is coupled through PCI bus 217 to south bridge 219. Industry standard architecture (ISA) bus 223 is coupled to south bridge 219. South bridge 219 serves in one capacity as a bridge between the PCI bus and the ISA bus. By incorporating all the local APICs on the south bridge along with the I/O APIC, the serial bus through which the local APICs and I/O APIC communicated with each other in prior art systems can be eliminated, thus reducing the latency inherent in a complex serial bus architecture.

South bridge 219 includes hardware that is software compatible with the industry standard APIC register set used by various multiprocessor capable operating systems. The APIC logic on the south bridge is divided into the I/O APIC 229 which provides routing for traditional ISA based interrupts and other hardware interrupts, and the local APICs which provide the bulk of the logic including timers, interrupt holding registers, interrupt distribution logic, and other standard logic found in prior art local APICs. For the embodiment illustrated in FIG. 2, the I/O APIC block 229 has 24 interrupt request (IRQ) lines and there are four identical local APIC blocks, one for each of four CPUs supported in the illustrated embodiment. The APICs are preferably initialized to be disabled and in programmable interrupt controller (PIC) mode. PIC mode is a mode in which the APIC is disabled and the interrupt line going to the CPU (INTR), and non-maskable interrupt (NMI) outputs come from legacy ISA bus logic.

Figure 3:
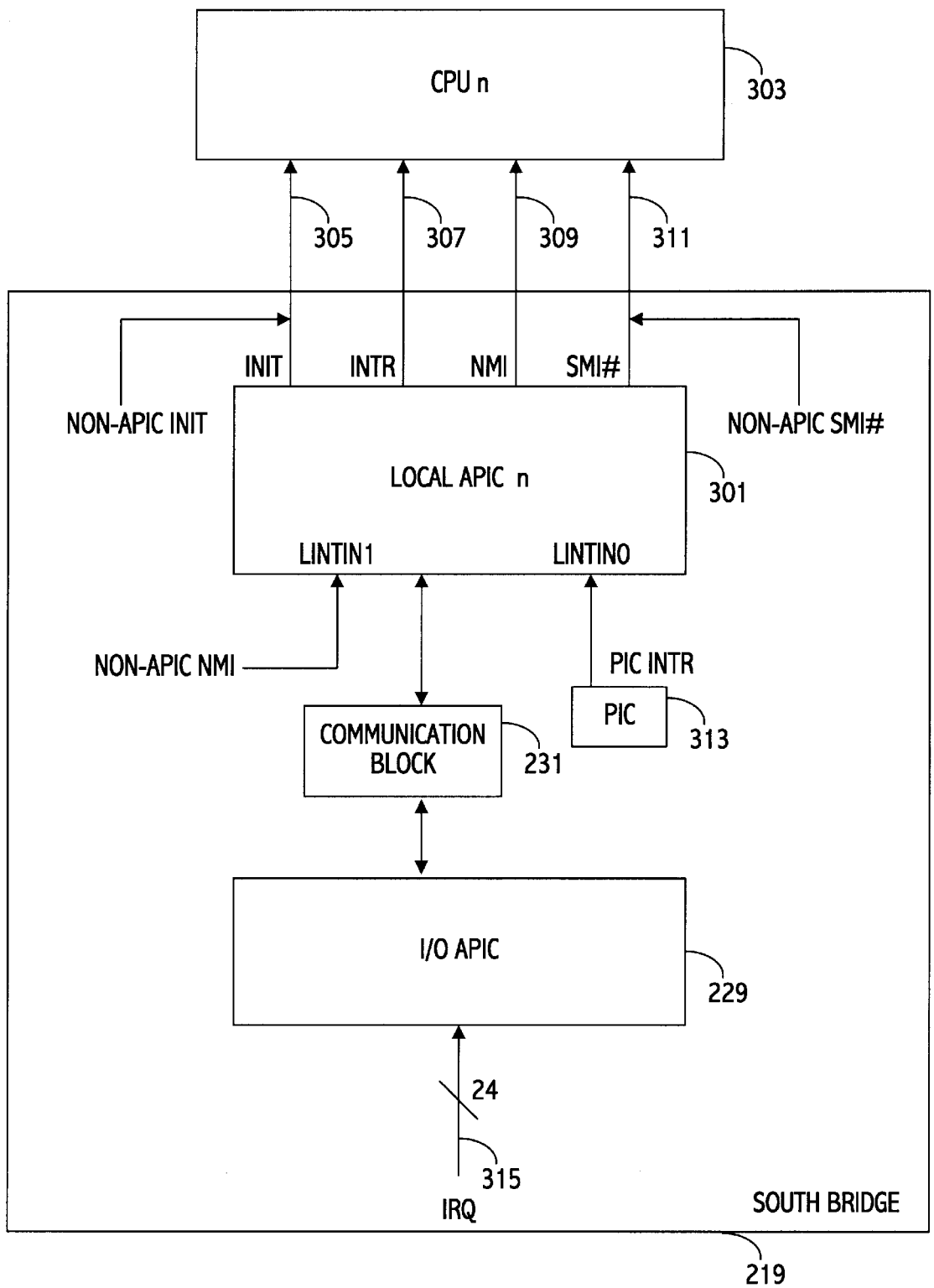
FIG. 3 shows the further details of one of the local APICs, its interface to its CPU and the I/O APIC, according to the present invention.

Referring to FIG. 3, one of the local APICs resident on south bridge 219 is shown with its interconnections to I/O APIC 229 and CPU 303. Each of the four local APICs in the illustrated embodiment in FIG. 2 control a set of four signals as shown in FIG. 3 that connect to their corresponding CPUs. The four signals are initialize (INIT) 305, interrupt (INTR) 307, non-maskable interrupt (NMI) 309, and system management interrupt (SMI#) (the pound sign indicating an active low signal). The local and I/O APIC blocks are clocked off of the PCI clock and power is preferably provided by main power. The non-APIC sources of NMI, for example, ISA bus IOCHK#, are connected to all of the local APIC's local interrupt 1 (LINTIN1) pins, as shown in FIG. 3. The INTR output of the PIC 313, the legacy interrupt controller, is connected to the local interrupt zero pin (LINTIN0) of the local APIC. In the embodiment shown, the LINTIN0 pins are grounded when the APICs are not enabled. The output of all the non-APIC sources of SMI# from the power management block in the south bridge is ORed into the SMI# outputs from each local APIC. Note that a logical AND operation can be used since the signal is active low. As illustrated in FIG. 3, an equivalent wired OR configuration may be used. SMI# can also optionally be run into I/O APIC IRQ23. The output of the non-APIC logic that generates INIT is ORed into the INIT outputs from each local APIC.

The other CPU signals controlled by the south bridge such as CPURST, STPCLK#, FERR#, IGNNE#, and A20M are connected to either the boot processor or all processors as required by the "Multiprocessor Specification", available from Intel Corp., Version 1.4, dated May 1997, which is incorporated herein by reference.

When the north bridge is in PIC mode, it passes interrupt acknowledge cycles to the south bridge's 8259-based PIC. When in APIC mode, in one embodiment, interrupt acknowledge cycles are all converted by the north bridge to south bridge configuration space, function zero, offsets (8C,88,84,80), as described further herein. However, if a local APIC sets INTR to a CPU for an ExtINT interrupt (as defined by the APIC register set), then the resultant interrupt acknowledge cycle is to be directed to the PIC rather than the APIC. Thus, in this case, the PIC provides the interrupt vector back to the PCI bus in the least significant byte of the DWORD for the configuration cycle.

As in the prior art APICs, each local APIC includes a timer that can be programmed to generate an interrupt. This timer is clocked with the PCI clock. When the CPU clocks are stopped externally with the south bridge's CPU# pin, then corresponding timers are also stopped.

The industry standard local APIC maps out 4 k bytes of memory space for its function. However, only the lowest 1 k bytes of this space includes register definitions. Because all CPUs in a multiprocessor system access the local APICs in the same physical address space, the north bridge manipulates the CPU accesses to their local APICs as described further herein. That enables each CPU to properly access its own APIC address space.

The memory space for the four local APICs in the south bridge is located at fixed addresses hexadecimal FEE0_0000 through FEE0_0FFF. Each of these are the standard addresses for the local APICs, because each processor uses the same addresses. When the processors attempt to access their local APIC over the host bus, the north bridge must redefine the address to uniquely identify the memory location in the south bridge which corresponds to that processor's APIC. In order to identify which of the local APICs should be addressed when the north bridge receives a request to access one of the fixed addresses at which APIC registers reside, the north bridge determines which processor issued the access request to its corresponding APIC.

The north bridge can identify which processor issued the request in several different ways depending for example, upon the way each processor is coupled to the north bridge. In one embodiment, each processor must request access to the host bus and thus the north bridge can determine which processor is requesting local APIC access according to which processor is granted the host bus. In another embodiment, each of the CPUs are coupled to the north bridge via a separate bus and the processor that is requesting local APIC access can be identified according to which bus is active with the APIC access request.

Once the north bridge determines which processor is requesting access to its local APIC, the north bridge can modify the fixed APIC addresses to identify the processor making the APIC access request. For example, in a four CPU embodiment, the CPU can be identified by modifying bits 3:2 of the local APIC register address to represent the local APIC number, which equals the CPU number. Thus, e.g., CPU 0 would have (bits 3:2) left at 00, CPU 1 would have the bits modified to read "01", CPU 2 would have those bits modified to be "10", and CPU3 would have those bits modified to be "11".

That modification is possible because in the industry standard APIC register set, each local APIC uses only one quarter of the block reserved for it (4 bytes out of every 16 byte block). An exemplary table of standard APIC registers is shown in table 1.

TABLE 1

| Address | Register Name | Software Read/Write |
|---|---|---|
| FEE0 0000H | Reserved | |
| FEE0 0010H | Reserved | |
| FEE0 0020H | Local APIC ID Register | Read/Write |
| FEE0 0030H | Local APIC Version Register | Read only |
| FEE0 0040H | Reserved | |
| FEE0 0050H | Reserved | |
| FEE0 0060H | Reserved | |
| FEE0 0070H | Reserved | |
| FEE0 0080H | Task Priority Register | Read/Write |
| FEE0 0090H | Arbitration Priority Register | Read only |
| FEE0 00A0H | Processor Priority Register | Read only |
| FEE0 00B0H | EOI Register | Write only |
| FEE0 00C0H | Reserved | |
| FEE0 00D0H | Logical Destination Register | Read/Write |
| FEE0 00E0H | Destination Format Register | Bits 0–27 Read only; Bits 28–31 Read/Write |
| FEE0 00F0H | Spurious Interrupt Vector Register | Bits 0–3 Read only; Bits 4–9 Read/Write |
| FEE0 0100H Through FEE0 0170H | ISR 0-255 | Read only |
| FEE0 0180H through FEE0 01F0H | TMR 0-255 | Read only |
| FEE0 0200H through FEE0 0270H | IRR 0-255 | Read only |
| FEE0 0280H | Error Status Register | Read only |
| FEE0 0290H through FEE0 02F0H | Reserved | |
| FEE0 0300H | Interrupt Command Reg. 0–31 | Read/Write |
| FEE0 0310H | Interrupt Command Reg. 32–63 | Read/Write |
| FEE0 0320H | Local Vector Table (Timer) | Read/Write |
| FEE0 0330H | Reserved | |
| FEE0 0340H | Performance Counter LVT | Read/Write |
| FEE0 0350H | Local Vector Table (LINT0) | Read/Write |
| FEE0 0360H | Local Vector Table (LINT1) | Read/Write |
| FEE0 0370H | Local Vector Table (Error) | Read/Write |
| FEE0 0380H | Initial Count Register for Timer | Read/Write |
| FEE0 0390H | Current Count Register for Timer | Read only |
| FEE0 03A0H through FEE0 03D0H | Reserved | |
| FEE0 03E0H | Timer Divide Configuration Register | Read/Write |
| FEE0 03F0H | Reserved | |

As can be seen in Table 1, each register occupies 16 bytes of address space. The lower 12 bits of the 32 bit address select the register in the local APIC register set. Further details on local APICs can be found in the "Pentium Pro Family Developer's Manual Volume 3: Operating Systems Writers Manual", pages 7-1 to 7-45, 1996, available from Intel Corp., which is incorporated herein by reference. Thus, the north bridge translates accesses to local APIC memory space (FEE0_0000 through FEE0_0FFF) by adding, four times the CPU number, to the PCI address, where the CPU number can vary from 0–3. Multiplying the CPU number by 4 and adding that to the PCI address has the effect of modifying address bits 3:2 which uniquely identifies which of the four APIC register sets should be accessed. Thus, address bits (3:2) become the CPU number and the south bridge operates on the same local APIC address blocks as the CPU generates, but is able to distinguish accesses to each of four APICs. The north bridge preferably passes these accesses through to the PCI bus without posting or reordering.

Figure 4:
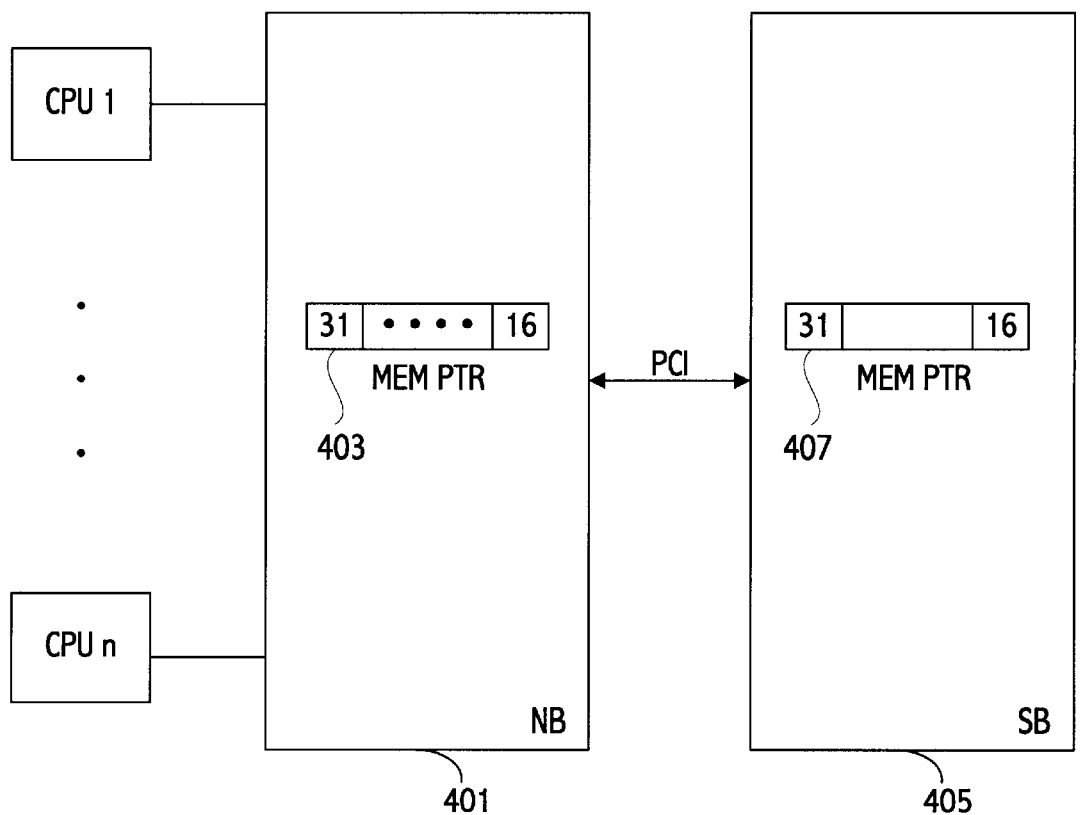
FIG. 4 shows an embodiment in which APIC address space in the south bridge is remapped into a block located elsewhere in the address space.

In another embodiment of the invention as illustrated in FIG. 4, the processor issuing the APIC access request is identified to the south bridge somewhat differently. In this approach, the north bridge 401 includes a memory pointer register 403 which includes the high order 16 bits of the address (31:16). These high order bits allow the standard APIC address FEE0_0XXX (a 4 kbyte address block) to be remapped into any 4 kbyte block in a 4 gigabyte address space. Thus, when the north bridge sees the standard APIC high order address bits on the local bus (FEE0), it translates those address bits to the high order address bits (31:16) corresponding to the high order address bits contained in memory pointer 403. South bridge integrated circuit 405 also contains a memory pointer register 407 which, in the illustrated embodiment, is set by the basic input/output system (BIOS) to be the same address as in north bridge memory pointer register 403. Thus, both the north bridge integrated circuit and the south bridge integrated circuit interpret an access operation by one of the CPUs shown in FIG. 4 to the address contained in memory pointers 403 and 407 to be an access request to local APIC address space.

The south bridge still has to know which local APIC the access is intended for since there are multiple CPUs and therefore multiple local APICs. Therefore, in this embodiment, address bits (15:12) are used by the north bridge to indicate which CPU was the source of the local APIC request, thereby indicating the target local APIC. Using four bits, the number of processors that can be supported with local APICs is 16. Bits (11:0) of the 32 bit address are the same as the CPU generated address for the local APIC and indicate which specific APIC register the particular CPU wishes to access.

Referring back to FIG. 3, when I/O APIC 229 receives an external interrupt over one of the 24 IRQ lines 315, the I/O APIC communicates the existence of that interrupt through communication circuit 231 to the appropriate local APIC. The direct communication between I/O APIC 229 and the local APICs through communication block 231 reduces the latency involved in providing interrupt information to the local APICs to be serviced by one of the CPUs as compared to the prior art serial bus techniques. The communication circuit 231 and its interconnection to the local APICs is described further herein.

As discussed, the I/O APIC supports 24 IRQ lines. The IRQ lines may be connected to the I/O APIC as shown in Table 2.

TABLE 2

| APIC IRQ | Connection | APIC IRQ | Connection | APIC IRQ | Connection | APIC IRQ | Connection |
|---|---|---|---|---|---|---|---|
| 0 | PIC INTR out | 6 | PIC IRQ6 (ISA) | 12 | PIC IRQ12 (ISA or mouse) | 18 | PCI PIRQC# |
| 1 | PIC IRQ1 (KBD) | 7 | PIC IRQ7 (ISA) | 13 | PIC IRQ13 (ISA or floating point error) | 19 | PCI PIRQD# |
| 2 | PIC IRQ0 (PIT) | 8 | PIC INT8 (RTC) | 14 | PIC IRQ14 (ISA) | 20 | Extra south bridge pin |
| 3 | PIC IRQ3 (ISA) | 9 | PIC IRQ9 (ISA) | 15 | PIC IRQ15 (ISA) | 21 | Extra south bridge pin |
| 4 | PIC IRQ4 (ISA) | 10 | PIC IRQ10 (ISA) | 16 | PCI PIRQA# | 22 | Extra south bridge pin |
| 5 | PIC IRQ5 ISA | 11 | PIC IRQ11 (ISA) | 17 | PCI PIRQB# | 23 | SMI |

The I/O APIC register set is indexed through two fixed location memory ports as in prior art I/O APICs. The memory space for the I/O APIC is located at fixed addresses FEC0_0000 and FEC0_0010. Access through the I/O APIC through these registers is known in the art and not described further herein. The I/O APIC is described in the Intel datasheet "82093AA I/O Advanced Programmable Interrupt Controller (IOAPIC)", pages 1–20 (1996), which is incorporated herein by reference.

The north bridge includes one auto-lock bit per CPU and PCI configuration space. Each of these bits is read/write capable. They are set to the active state at system reset. Any CPU that is granted access to the north bridge while its corresponding auto-lock bit is set, locks out all other CPUs from accessing the north bridge. The CPU that owns the north bridge locks out all other CPUs until it clears its auto-lock bit to the inactive state. In this way, the first CPU to be granted access to the north bridge can declare itself the boot processor and initialize the system without the possibility that other CPUs are asynchronously accessing similar registers (index registers in particular). Then the subsequent CPUs that are granted access to the north bridge can be given exclusive access to the system in order. BIOS code can direct each of these non-boot processors to clear their auto-lock bits, shut down, and wait for the startup IPI as described in the multiprocessor specification.

The north bridge provides the boot CPU with the number of CPUs in the system. The register that contains this data reflects the number of CPUs in the system shortly after the boot CPU begins execution. The north bridge should appropriately deal with CPU accesses to the 12 unused bytes in the industry-standard local APIC register space. For example, the north bridge issues an error indication on access to those bytes.

In addition to register reads and writes of APIC address space, the interrupt system also expects a CPU, upon receipt of an interrupt, to respond with an interrupt acknowledge cycle which retrieves an interrupt vector for the CPU. The interrupt vector corresponds to the interrupt that the processor received and identifies the appropriate software for servicing the interrupt. In the present invention, because the local APICs reside in the south bridge integrated circuit, the north bridge translates interrupt acknowledge cycles that it receives over the host bus from one of the CPUs into an appropriate action on the PCI bus that will retrieve the interrupt vector required by the acknowledging CPU.

In one embodiment of the present invention, the north bridge includes a 32-bit pointer register-located in its non-standard PCI configuration space that specifies the address of the south bridge interrupt acknowledge registers in configuration space. The 8 bit interrupt acknowledge registers for each CPU are in the least significant bits of 4 consecutive address location containing interrupt acknowledge vectors (DWORDs) in the south bridge. In a manner similar to a read or write access to local APIC address space, the north bridge in one embodiment translates the CPU initiated interrupt acknowledge cycle into single reads of the interrupt acknowledge register located in the south bridge. Based upon the source of the interrupt acknowledge, i.e., the processor that is issuing the interrupt acknowledge, the north bridge adds bits (3:2) to indicate the CPU number to a read address. In this embodiment, the north bridge does not provide a PCI interrupt acknowledge cycle. Instead, the north bridge translates the CPU initiated interrupt acknowledge cycle into single reads of one of the interrupt acknowledge registers located in the south bridge configuration space addressed by the interrupt acknowledge pointer.

Figure 5:
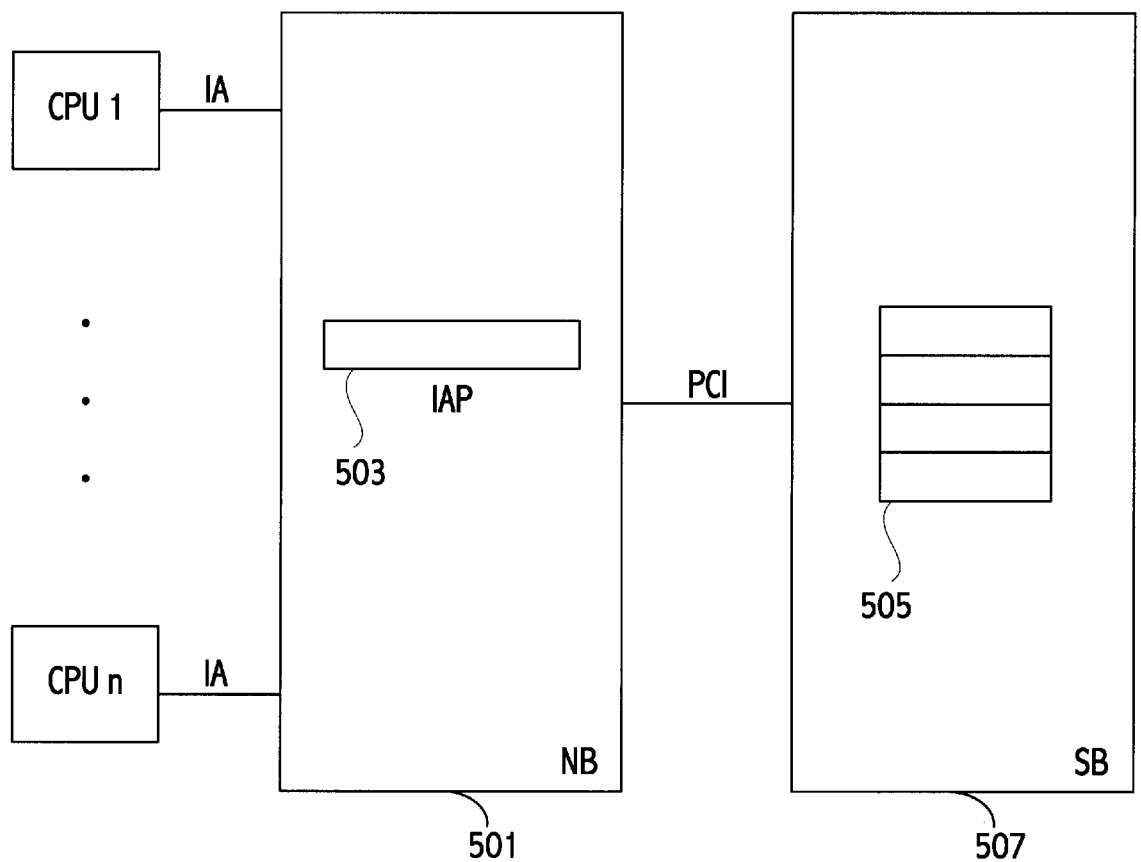
FIG. 5 shows the interrupt acknowledge pointer in the north bridge which points to the interrupt acknowledge registers in south bridge.

Referring to FIG. 5, assume CPU 1 issues in interrupt acknowledge. North bridge 501 contains interrupt acknowledge pointer 503 which points to the interrupt acknowledge registers 505 in south bridge 507. Bits (3:2) of the interrupt instruction pointer are changed to reflect the issuing CPU number, which indicates which CPU issued the acknowledge. A read of the appropriate one of the vector registers 505 is then performed across the PCI bus.

In another embodiment of the invention, rather than translating an interrupt acknowledge cycle into a single read of the appropriate interrupt acknowledge register in the south bridge, in response to a CPU issuing an interrupt acknowledge, the north bridge issues a PCI interrupt acknowledge command on the PCI bus linking north bridge 501 and south bridge 507. Conventionally, an address is not driven on the PCI bus during the address phase of a PCI interrupt acknowledge cycle. The north bridge places the CPU ID on the PCI bus during the address phase of the interrupt acknowledge cycle. In the illustrated embodiment, address bits (15:12) indicate the acknowledging processors ID. Thus, up to 16 processors can be represented.

The north bridge, in the illustrated embodiment, clears all buffers that contain bus cycles before allowing interrupt acknowledge cycles and accesses to system management space to occur. It is beneficial to reduce the access latency to local APIC and interrupt acknowledge vector address spaces as much as possible. Thus, the north bridge's internal and PCI arbiters grant the highest priority to host accesses to the local APIC and interrupt acknowledge address spaces. It is preferable that these cycles not be reordered or posted. To further reduce latency, the south bridge in the illustrated embodiment provides that the access will be completed in a certain number of PCI clocks, e.g., eight PCI clocks after the PCI bus signal FRAME# is asserted for the cycle and will not be retried with a target abort.

The north bridge in the illustrated embodiment includes an APIC enable bit. When not asserted, this bit specifies that accesses to the local APIC space (located at FEE0_0000–FEE0_0FFF) are not translated as described, based on either of the several translation schemes described above and interrupt acknowledge cycles are passed to the PCI bus without translation. When asserted, the translations, as described above, are enabled for all CPUs. The power up state of this control bit is preferably low (APIC disabled).

In one embodiment, the south bridge includes configuration registers in configuration space function zero offset 8F through 80. A four byte interrupt acknowledge register is provided for each of the four local APICs supported. These registers transfer data to the requesting PCI bus master within a predetermined number of PCI clocks (e.g., 8) after FRAME# is asserted. PCI-defined retries are not legal to these registers in the illustrated embodiment. The interrupt acknowledge registers are shown in FIG. 6A. Each interrupt acknowledge register is 32 bits long with bits (31:8) reserved and bits (7:0) providing the 8 bit interrupt acknowledge vector. The interrupt acknowledge value is set up by internal logic to specify the interrupt vector for the CPU in response to a south bridge asserted INTR line to the CPU. The CPU responds to INTR by generating an interrupt acknowledge cycle. These cycles are translated by the north bridge to PCI configuration space read cycles to this address as previously described.

Additionally, the south bridge contains a 32 bit local APIC control register for each APIC supported. The control registers are located in South bridge configuration space, function zero. The offsets for the local APIC control registers are 9F–90. The default values for each control register is $0000_{13}$ 0X20 where X is 0 for offset 90, 1 for 94, 2 for 98, and 3 for 9 C. The control registers are read/write registers. The local APIC control register is shown in FIG. 6B. Bits 31:24 are reserved. Bits 23:16 provide the local APIC version number (LAVER). Bits 15:10 are reserved. Bit 9 provides the local APIC enable bit. When deasserted, accesses to the local APIC register space are ignored and the local APIC is masked from generating interrupts. When high, the local APIC is enabled. The local APIC version number field provides back door read/write access to the APIC version register located at FEE0_0030 in the industry standard APIC register set (where it is read only). Bit 8 provides the startup status bit. When the startup interprocessor interrupt (IPI) is directed at the CPU that corresponds to this local APIC, this bit is set high. Hardware sets this field which is also read/write accessible from software. Bits 7:0 contain the startup vector. When the startup IPI is directed at the CPU that corresponds to this local APIC, the startup vector contained within the command is stored in this register. This field is set by hardware and is also read/write accessible from software. The startup IPI, which is generated by the interrupt command register of the industry standard local APIC register set, causes the target processors to start execution from the hexadecimal address "000,SUVEC, 000", which is a 20 bit address where the startup vector (SUVEC) is an 8 bit startup vector. For these systems, when the boot processor sends the startup IPI to its local APIC via the interrupt command register, the 8 bit vector number is sent the SUVEC field of all the target processors, the startup status (SUSTAT) bit for each target CPU is set, and the target CPUs are reset with their INIT pins.

The target CPUs then start execution from BIOS at hexadecimal address FFFF_FFF0. The BIOS code will check the startup IPI status register to see if the startup IPI bit has just been sent. If so, the contents of the startup vector register will be moved to bits (19:12) of the code segment and the CPUs will begin execution from that point. In that way, these systems will emulate the behavior of CPUs that contain a local APIC with the startup IPI logic.

The south bridge also contains an APIC configuration register for the I/O APIC. It is an 8 bit register in south bridge configuration space, function 0 at offset 0. Its default value is 00 and it is a read/write register. Bits 7:1 of the register are reserved and bit 0 is the APIC enable bit. When low, accesses to the local and I/O APIC register spaces are ignored and the local APICs are masked from generated interrupts. Also, the ISA compatible PIC is enabled to generate interrupts onto the INTR (0) pin. When high, the APIC blocks are enabled and the direct connection to the INTR 0 pin is disabled.

Figure 7:
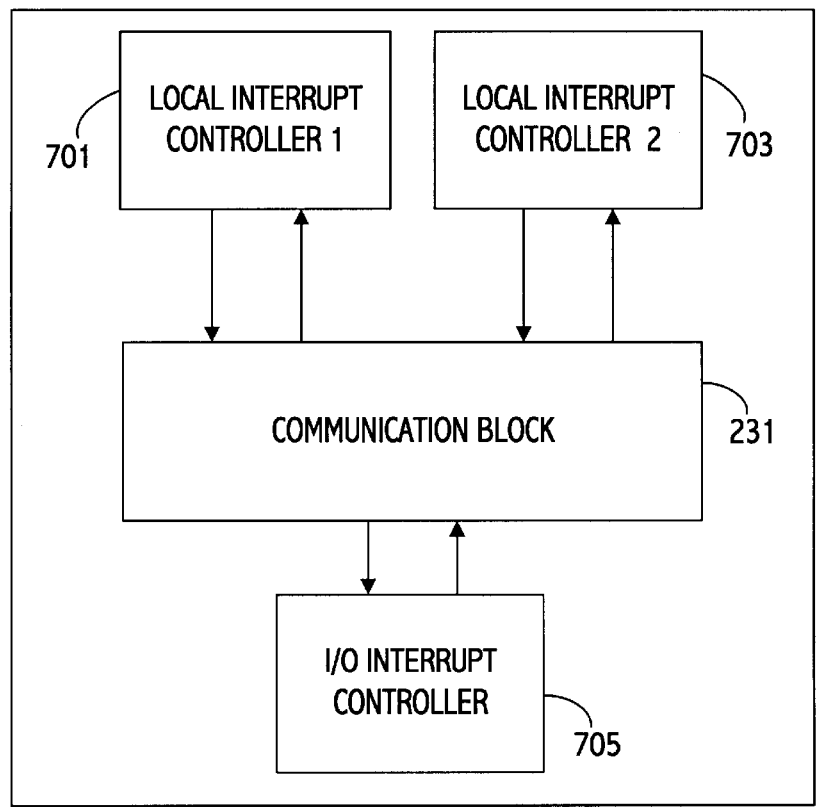
FIG. 7 shows the communication circuit coupled to two local interrupt controllers.

Referring to FIG. 7, the interconnection for an embodiment in which the communication circuit 231 is coupled to two local interrupt controllers, APICs 701 and 703 and to an I/O interrupt controller, APIC 705, is now described in greater detail. The communication circuit 231 functions in large measure as a multiplexer, providing signals to the interrupt controllers 701, 703, and 705 according to which of the interrupt controllers wins arbitration based on standard APIC arbitration schemes which generally uses a rotating priority arbitration protocol. Unlike in prior schemes, however, the arbitration does not take place over a serial type bus, but instead in arbitration logic in the communication circuit. Thus, the APICs send their arbitration information (arbitration IDs, processor priority and focus bits) for the arbitration logic to determine who has priority according to conventional APIC priority schemes. The arbitration logic also provides the next arbitration ID for the APICs according to the conventional APIC arbitration scheme. Note however, that the determination is being made in a central location rather than being determined by arbitration across a serial bus as in the prior art scheme.

Figure 8:
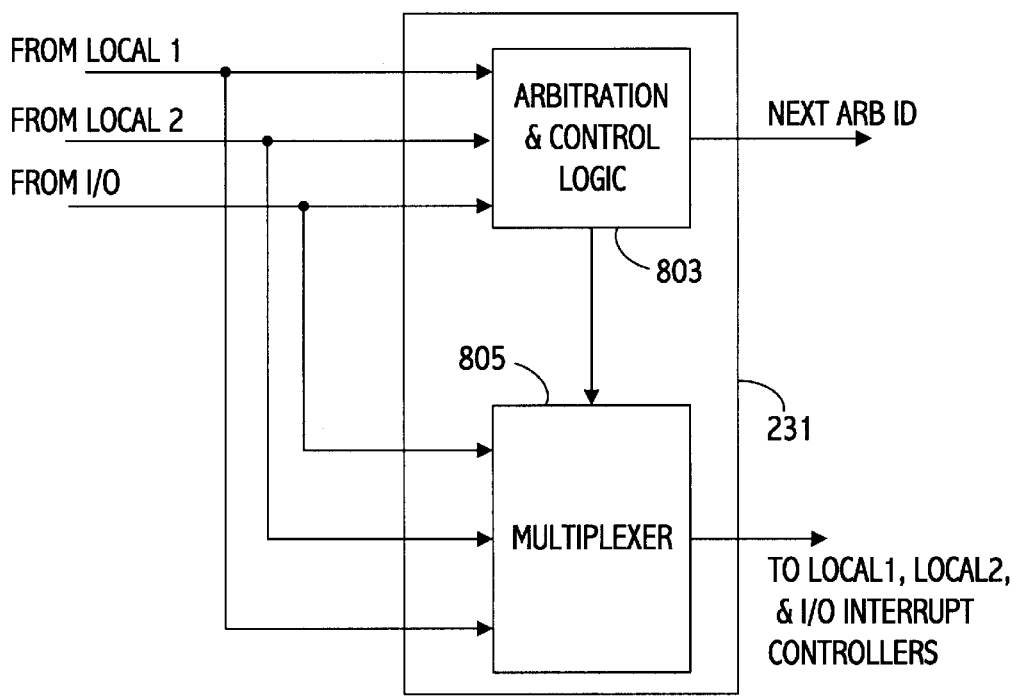
FIG. 8 shows a simplified block diagram of the communication circuit.

Referring to FIG. 8, each of the interrupt controllers 701, 703 and 705 provide data, including arbitration identification signals to communication circuit 231. The arbitration signals are provided to arbitration and control logic 803. The various data signals are provided to a multiplexer function 805 which selectably provides signals from one of the interrupt controllers as inputs to all the interrupt controllers according to which of the interrupt controllers won the arbitration. The rotating priority mechanism in the arbitration logic is implemented in combinational logic and implements the arbitration mechanism and protocol known in the art and described in "Pentium Pro Family Developer's Manual Volume 3: Operating Systems Writers Manual." Because the data is being provided in parallel rather than over a serial bus, there is a significant improvement in performance when communicating between APIC devices.

In addition to determining which device wins arbitration, arbitration and control logic 803 also determines which of the interrupt controllers are selected to receive interrupt information from another of the interrupt controllers as will be described further herein.

Figure 9:
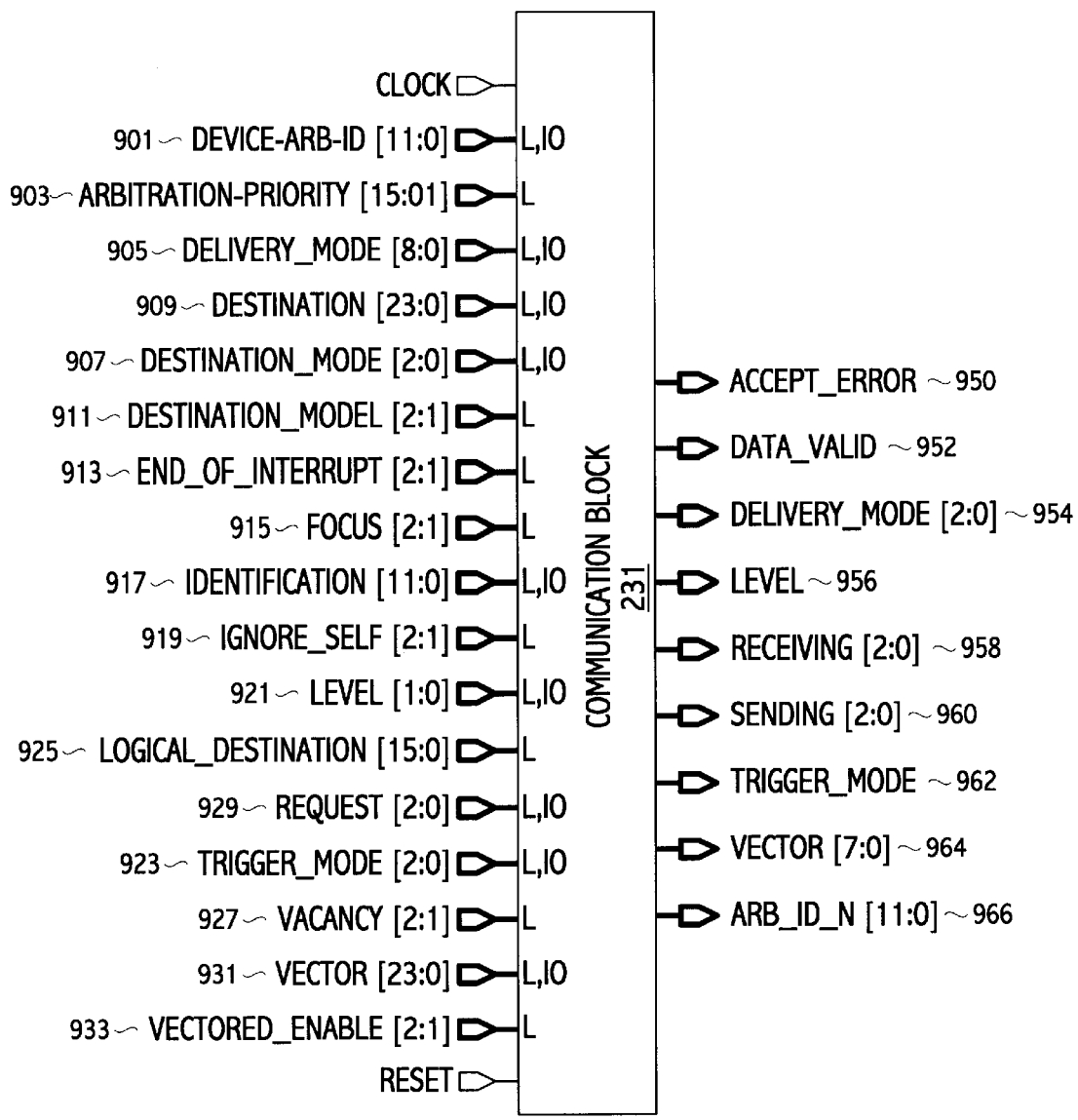
FIG. 9 shows the signal connections for the communication circuit.

Referring to FIG. 9, the connections to communication circuit 231 are shown. The signals from the interrupt controllers enter the circuit from the left and are subsequently output and provided to the interrupt controllers. Those signals identified as "L" are from the local interrupt controllers and those identified as "IO" are from the input/output interrupt controller. The arbitration signals 901, four bits from each interrupt controller, are input to the arbitration logic 803. The device arbitration priority bits 903 are 8 bits from each of the local APICs indicating processor priority, e.g., during a non focused lowest priority message. The device delivery mode signals 905 specify the action required of the APICs listed in the destination field in response to the interrupt (e.g. fixed, lowest priority, SMI, NMI, INIT, Start Up). The destination mode signals select either physical or logical destination mode. The device destination address 909 is output from each of the controllers. Device identification bits 917 provide the 4 bit ID of each local and I/O APIC which are used to determine the destination APIC.

The device destination model 911 (flat or cluster) is provided only from local interrupt controllers and define the interpretation of the logical destination information (925) from the local APICs. The end of interrupt signals 913 are used to select the I/O APIC as a receiving device. The logical destination signals from the local APICs are used as the output according to the destination model. The device request bits 929, from each of the interrupt devices, indicate that the respective interrupt controller has data it wishes to transmit to other interrupt devices through the communication block. The vacancy bits 927 from the local APICS indicate there is room for a vectored interrupt on this interrupt device, that is, all the buffers are not full. The device vector bits 931 are the vector addresses from each of the interrupt controllers. The vectored enable bits 933 are indications of whether software has disabled the local APICs from receiving vectored interrupts. The device ignore self bits 919 indicate that the specified interrupt controller should send but not receive messages. That is, the message should be broadcast to all but the sending device. The device level bits 921 indicate the level of the interrupt (high or low) and the trigger mode 923 indicates edge or level triggering.

The output side of the communication block 231 is now described. As previously described, the communication block 231 provides both a multiplexing and control function.

The multiplexing functions selects as an output those signals provided by one of the interrupt controls. Thus, the delivery mode signals 954 provided by the communication circuit are those of the interrupt controller that wins the arbitration. The trigger mode 962 and vector signals 964 are those of the winning interrupt controller. The vector signals provide the destination signals when appropriate.

In addition to the multiplexing function, the communication block provides four bits of the next arbitration identification signals 966 to each of the interrupt controllers so that they know their arbitration identification and can provide their arbitration identification for the next bus arbitration.

The communication block also provides a control function. One of the receiving signals 958 is provided to each of the interrupt controllers to indicate that the respective interrupt controller is receiving data. The sending signals 960, in a similar fashion, indicates to the interrupt controllers whether they are sending data. Once an interrupt controller has requested to send data using its request bit 929, the communication block responds with a sending signal to the particular interrupt controller when the communication block is available and the data from the interrupt controller is actually being sent. The interrupt controller then can stop sending the data. Note that in the illustrated embodiment, one interrupt controller can send data and three interrupt controllers can receive data at any one time.

The accept error bit 950 indicates that none of the interrupt controllers accepted the interrupt. The data valid bit 952 indicates that there is valid data on the signals provided by the communication block. In one implementation each "bus cycle" is two clocks and the data valid bit indicates valid data on one of those clock cycles.

Figure 10:
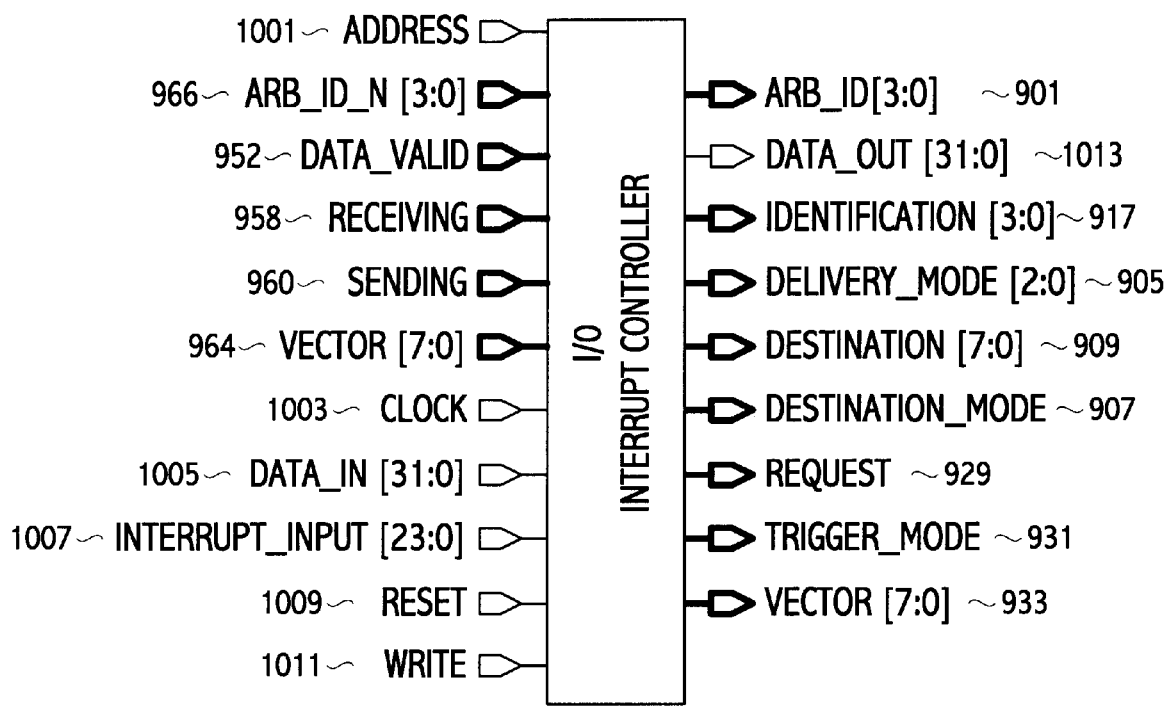
FIG. 10 shows the signal connections for the I/O interrupt controller.

Referring to FIG. 10, the connection to the I/O APIC is shown. The signals received from the communication circuit are indicated by the same reference numbers as the signals output from the communication circuit. Note that the signals are, in some cases, subsets of those output by the communication circuit. For example, only four of the twelve next arbitration identification bits output by the communication block are received by the I/O APIC. Other signals received by the I/O APIC include address signals 1001, data signals 1005, clock 1003, the interrupt inputs 1007, reset 1009, and write 1011. Those signals are conventional I/O APIC signals and further explanation of them are not needed for understanding of the present invention.

The signals output by the I/O APIC include subsets of the signals received by the communication block including arbitration signals 901, identification signals 917, delivery mode signals 905, destination address 909, destination mode 907, request signals 929, trigger mode 931 and the eight bit vector 933. Again note that although these signals are identified by the same reference identifier as those received by the communication block, they are in fact subsets of those signals. The data signals 1013 output by the I/O APIC are conventional. Note that the I/O APIC interrupts are edge triggered so it does not provide a level signal to the communication block 231 as do the local APICs.

Figure 11:
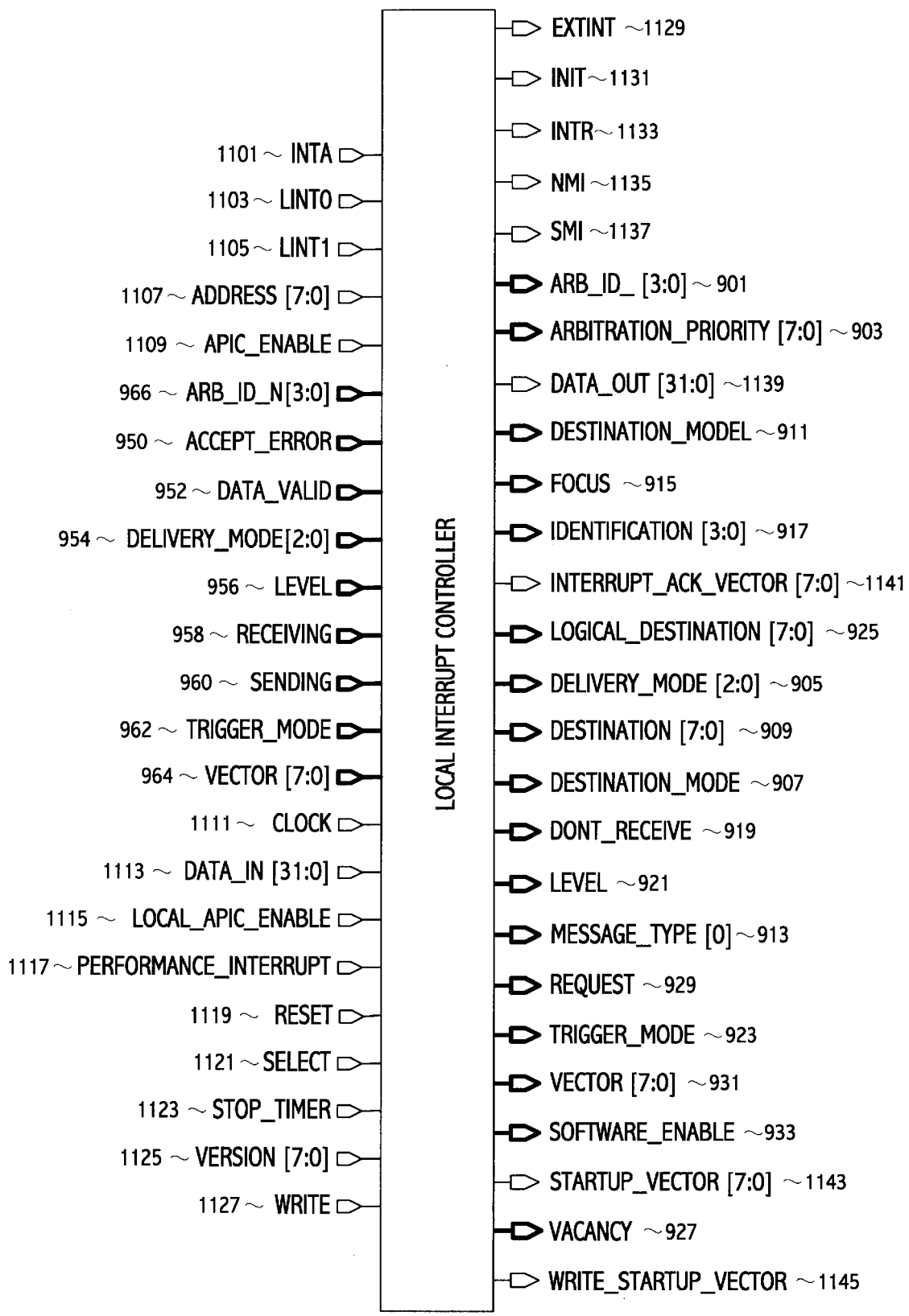
FIG. 11 shows the signal connections for the local interrupt controller.

Referring to FIG. 11, the connection to one of the local APICs is shown. The signals received from the communication circuit are indicated by the same reference numbers as the signals provided by the communication block. Note that the signals in certain cases, are subsets of those output by the communication circuit. For example, only four of the twelve next arbitration identification bits output by the communication block are received by any one local APIC. Other signals received by the local APIC which are not provided by the communication circuit include interrupt acknowledge (INTA) signal 1101, local interrupts 1103 and 1105, address signals 1107, enable bits 1109, clock 1111 and data 1113. Note that only 8 address signals are needed to address each local APIC since the data bus 1113 is 32 bits wide and only one fourth of the 4K address space is used by each local APIC. In addition a select signal 1121 is used to indicate that this local APIC is selected for register access.

Note there are two enable signals 1109 and 1115. Enable signal 1109 is a global enable signal while each local APIC receives local APIC enable signal 1115. The performance interrupt signal 1117 is signal provided by the performance counter. Stop timer signal 1123 stops the local APIC timer when the CPU clock is stopped. Version number 1125 provides an 8 bit version number so the APIC can identify itself to software. In the illustrated embodiment, the version number is programmable and provided from configuration space. In other implementations, the version number may be hardwired within the local APIC. The write signal 1127 indicates a write to a selected register.

The signals output by the local APIC (which are also output by the I/O APIC) to the communication block include subsets of the signals received by the communication block including arbitration signals 901, identification signals 917, level signal 921, delivery mode signals 905, destination address 909, destination mode 907, request signals 929, trigger mode 931 and the eight bit vector 933. Again, note that although these signals are identified by the same reference identifier as those received by the communication block, they are in fact subsets of those signals. In addition to those signals, each local APIC outputs signals to the communication circuit that are unique to the local APIC circuit. Those signals include arbitration priority signals 903, destination model signals 911, focus signals 915, logical destination signals 925, "don't receive" (ignore self) signal 919. Software enable 933 indicates that the local APIC has been enabled by software for vectored interrupts. Vacancy bit 927 indicates availability of interrupt slots within the local APIC. Message type 913 indicates whether or not the message is an end of interrupt.

In addition, the local APICs output signals external interrupt 1129, INIT, 1131, INTR 1133, NMI 1135, SMI 1137, data signals 1139, interrupt acknowledge vector 1141, startup vector 1143 and write startup vector signal 1145. In one implementation, the start up vector is stored in a storage location in configuration space. The write startup vector signal 1145 is used to indicate a write to that storage location. BIOS can read the storage location during a boot up process to obtain the vector value.

An interrupt message cycle starts with one of the interrupt controllers (APIC or I/O) asserting a request for a message transfer. The message can be one of the 4 types of messages, EOI message, short message, non-focused priority message and remote read message.

For an EOI message, the requesting processor puts out its arbitration ID and interrupt vectors as well as the indication that the message is an EOI message. The EOI message is directed to the I/O APIC. The communication block uses the sending and receiving signals to indicate respectively to the local APIC and I/O APIC that they are sending and receiving the EOI message.

For a short message the requesting interrupt controller outputs its arbitration ID as well as destination mode, delivery mode, level, trigger mode, interrupt vector and logical destination address (for logical delivery mode), device identification (for physical delivery mode) bits, and trigger bits. The communication circuit determines the destination APIC(s) according to the various control and destination information bits provided from the APICs and selects the destination(s) accordingly.

If there is no focus processor detected in response to the interrupt vector being output by the communication circuit to the interrupt controllers, the processor priority bits are used to determine the processor with the lowest priority. If two APICs (processors) have the same lowest priority, the arbitration ID bits break the tie. Only those APICs having free interrupt slots can win the lowest priority determination. Thus, the APICs provide the communication circuit with device vacancy signals.

The parallel APIC message approach described herein means that APIC bus signals that were previously provided serially, e.g., arbitration IDs, destination modes, delivery modes, trigger modes, interrupt vectors destination registers, processor priority, are all provided in parallel so the arbitration can be determined more quickly. In addition, the device that wins the arbitration can send messages more quickly. The implementation of the interrupt controller themselves, e.g., the interrupt distribution mechanisms, the control registers, timer modes and interrupt acceptance, are known in the art and described in references previously mentioned and accordingly are not described again herein.

The description of the invention set forth herein is illustrative, and it not intended to limit the scope of the invention as set forth in the following claims. For instance, while the invention has been described particularly with respect to a particular interrupt controller, other interrupt controllers performing similar functions can take advantage of the parallel configuration described herein. Other variations and modifications of the embodiments disclosed herein, may be made based on the description set forth herein, without departing from the scope and spirit of the invention as set forth in the following claims.

What is claimed is:

1. An integrated circuit, comprising:
   a first and a second local interrupt controller disposed on said integrated circuit, said first and second local interrupt controller coupled to controllably provide at least one interrupt request signal, respectively, to each of a first and second processor; and
   an input/output (I/O) interrupt controller disposed on said first integrated circuit and coupled to receive an interrupt request from at least one input/output device; and
   a communication circuit disposed on said first integrated circuit and coupled to said input/output interrupt controller and said first and second local interrupt controllers, said communication circuit providing for transfer of interrupt information between said first local interrupt controller, said second local interrupt controller and said input/output interrupt controller.

2. The integrated circuit as recited in claim 1 wherein each of said first and second local interrupt controllers is respectively coupled to provide said at least one interrupt request signal to an interrupt signal input on each of said first and second processors.

3. The integrated circuit as recited in claim 2 wherein each of said first and second local interrupt controllers is respectively coupled to further provide a reset signal, a non maskable interrupt signal (NMI) and a system management interrupt (SMI) to each of said first and second processors.

4. The integrated circuit as recited in 3 wherein each of said local interrupt controllers is coupled to provide in parallel to said communication circuit a plurality of bits of destination address bits and a plurality of logical destination address bits.

5. The integrated circuit as recited in claim 4 wherein said each of said local interrupt controllers is coupled to receive non-APIC sources of non maskable interrupts on a local interrupt input.

6. The integrated circuit as recited in claim 5 wherein the local interrupt inputs to said first and second interrupt controllers are grounded when said local interrupt controllers are not enabled.

7. The integrated circuit as recited in claim 3 wherein each of said system management interrupt (SMI) outputs from said first and second local interrupt controllers is logically combined on said integrated circuit with power management interrupts.

8. The integrated circuit as recited in claim 1 further comprising a third and fourth local interrupt controller disposed on said integrated circuit.

9. The integrated circuit as recited in claim 1 wherein said communication circuit is coupled to receive arbitration identification signals in parallel from said first and second local interrupt controllers and said input/output interrupt controller and to determine which of said interrupt controllers won an arbitration, and wherein said communication circuit is coupled to provide said first and second local interrupt controllers and said input/output interrupt controller with first, second and third next arbitration identification signals, thereby providing arbitration identification signals for each of said interrupt controllers for a next arbitration cycle.

10. The integrated circuit as recited in claim 9 wherein said communication circuit selectably provides a vector output in parallel according to which of said interrupt controllers won the arbitration cycle.

11. The integrated circuit as recited in claim 1 wherein each of the interrupt controllers is coupled to said communication circuit to receive a separate receiving signal indicating the respective interrupt controller is selected to receive data from the communication block.

12. The integrated circuit as recited in claim 11 wherein each of the interrupt controllers is coupled to said communication circuit to receive a separate send signal indicating to the respective interrupt controller that it is selected to send data.

13. A multi-processor computer system, comprising:
   a first and second processor;
   a first integrated circuit including a first and second local interrupt controller disposed on a first integrated circuit, said first and second local interrupt controllers for respectively controlling interrupts for said first and second processors;

an input/output (I/O) interrupt controller disposed on said first integrated circuit having a plurality of interrupt request inputs coupled to receive interrupts requests; and communication circuit disposed on said first integrated circuit and coupled to said input/output interrupt controller and said first and second local interrupt controllers, said communication circuit providing said interrupt requests received on said I/O interrupt controller to at least one of said first and second local interrupt controllers.

14. The computer system as recited in claim 13, further comprising:

a host bus coupled to said first and second processors;

a second integrated circuit coupled between said host bus and a first expansion bus, said second integrated circuit providing a bridge function between said host bus and said first expansion bus; and wherein said first integrated circuit is coupled between a second expansion bus and said first expansion bus, said first integrated circuit providing a bridging function between said first and said second expansion bus.

15. The computer system as recited in claim 14, wherein said first and said second local interrupt controller are respectively coupled to provide said at least one interrupt request signal to an interrupt signal input on each of said first and second processors, and wherein each said first and said second local interrupt controller is further coupled to provide a reset signal, a non maskable interrupt signal and a system management interrupt to each of said first and second processors.

16. The computer system as recited in claim 14 wherein said first expansion bus is a PCI bus and said second expansion bus is an ISA bus.

17. A method of providing interrupts in a multiprocessor computer system having a plurality of processors, comprising:

providing a plurality of local interrupt controllers disposed on a first integrated circuit;

providing at least one input/output interrupt controller disposed on said first integrated circuit and communicatively coupled to said plurality of local interrupt controllers via a communication circuit;

sending an interrupt request to said input/output interrupt controller from an input/output device;

providing at least one of said local interrupt controllers with information relating to said interrupt request through said communication circuit; and communicating a processor interrupt request from said one of said local interrupt controllers to one of said processors via one of a plurality of local signal lines.

18. The method as recited in claim 17 wherein each of said local interrupt controllers includes a local interrupt controller register set conforming to an industry standard local advanced programmable interrupt controller (APIC) register set and wherein said input/output interrupt controller includes a register set conforming to an industry standard input/output advanced programmable interrupt controller (I/O APIC) register set.

19. The method as recited in claim 17 further comprising:

receiving at the communication circuit arbitration identification signals from said first and second local interrupt controllers and said input/output interrupt controller; and providing to said first and second local interrupt controllers and said input/output interrupt controller with first, second and third next arbitration identification signals from said communication circuit, according to which of said interrupt controllers won arbitration in a current interrupt operation, thereby providing arbitration identification signals for a next interrupt operation which uses said communication circuit.

20. The method as recited in claim 17 further comprising:

determining in said communication circuit which of said interrupt controllers is a destination for an interrupt message; and providing an indication thereof to the interrupt controllers.

21. The method as recited in 17 further comprising:

receiving respective vector inputs from respective ones of said interrupt controllers at said communication circuit;

selectably outputting one of said vector inputs as a vector output according to which of said interrupt controllers won arbitration during an interrupt message.

22. A method of communicating interrupt messages between interrupt controllers in a multiprocessor system, comprising:

sending arbitration information from each of the interrupt controllers to a communication circuit;

determining in said communication circuit which of said interrupt controllers has won arbitration;

selectably providing vector information from the interrupt controller that won arbitration to a destination interrupt controller.

23. The method as recited in claim 22 further comprising:

receiving address information in the communication circuit from the interrupt controller and determining at least one destination interrupt controller according the address information; and providing the at least one destination interrupt controller with an indication that it is a destination.

24. The method as recited in claim 22 further comprising determining next arbitration information for the interrupt controllers according to the arbitration information and providing the interrupt controllers with an indication thereof.

25. The method as recited in claim 22 wherein each of the interrupt controllers asserts a respective request signal provided to the communication circuit to indicate that the interrupt controller asserting the request signal has an interrupt message to be transmitted to another of the interrupt devices.

26. The integrated circuit as recited in claim 1, wherein the first and second local interrupt controllers are coupled to be accessed by the first and second processors over a single bus.

27. The integrated circuit as recited in claim 26 wherein the single bus operates in accordance with a peripheral component interconnect (PCI) bus standard.

28. The multi processor system as recited in claim 13, wherein the first integrated circuit is coupled to receive over a first expansion bus access requests for the control registers of the first and second interrupt controllers.

29. The method as recited in claim 17, further comprising accessing the first and second local interrupt controllers from the first and second processors via an input/output bus coupled to the integrated circuit.

* * * * *